Figure 1:
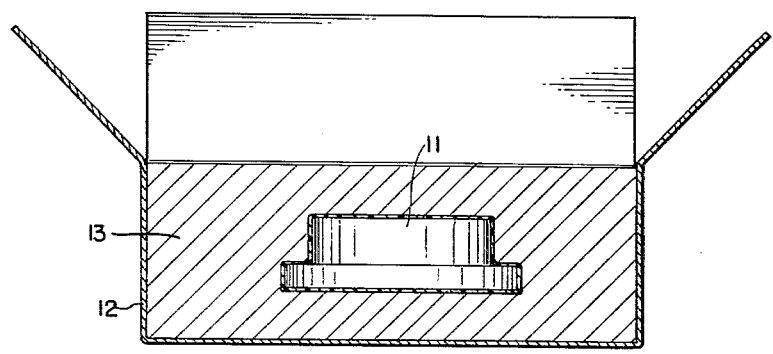

May 10, 1966    Y. H. SMITTER    3,250,383

PACKAGE

Filed Aug. 21, 1962

INVENTOR
YVOR H. SMITTER

Pennie, Edmonds, Morton, Taylor and Adams.
ATTORNEYS

3,250,383
PACKAGE
Yvor H. Smitter, c/o Water Dynamics & Design Ltd.,
1160 5th Ave., New York 29, N.Y.
Filed Aug. 21, 1962, Ser. No. 218,446
9 Claims. (Cl. 206—46)

This invention relates to packaging methods and specifically to a method wherein elastic gels or hydrogels are used to cushion various objects from the effects of shock and to form effective barriers against contamination of an object or objects immersed in the gel cushioning material.

In the packaging for shipping or storage of fragile and easily breakable items such as glass instruments, electronic devices, ceramics, glass containers, china, etc., considerable concern has been devoted by industrial packaging specialists to protective cushioning and barrier materials. Cushioning materials serve to protect a product from possible shock, impact, or vibration damage by means of providing closely embracing, continuous, uniform, and pliant support and product "flotation." Barrier materials shield the product from damaging vapors, gases, liquids, fire, pests, etc. The distinction between cushioning, barrier, and even wrapping, in packaging, is often indistinct and frequently a single material will serve multiple functions. A variety of cushioning materials and devices are presently available to packagers and these include, in outline, the following:

I. Matted fibre structures

A. Cellulosic—excelsior, paper, paper pulp, wood felt, bagasse, cotton, jute, straw, cellophane shavings, etc.
    B. Animal fibres—curled hair, felt, wool, rubberized wool, etc.
    C. Inorganic fibres—spun glass, asbestos, metal shavings, etc.

II. Cellular structures—cork slab, wood, natural and synthetic elastomers, foamed polystyrene III. Corrugated, creped, ridged, and molded structures—paper, wood derivatives, blown plastics, etc.

IV. Granular materials—shredded elastomers, ground cork, colored popcorn, sawdust, vermiculite, etc.

V. Cushioning mechanisms—spring platforms, shock mounts

Barrier materials include:

I. Papers—kraft papers, coated and impregnated papers, laminated papers, reinforced papers II. Fabrics—jutes, cotton, fabric laminates, impregnated natural and synthetic fibres III. Films—cellophane, cellulose acetate, rubber-hydrochloride ("Pliofilm"), vinylidene ("Saran," "Cryovac"), polyethylene, polyester film ("Mylar"), vinyl films, film laminates IV. Foils—aluminum, tin, lead, tin and lead compositions The present invention relates to an improved packaging method employing hydrogels or gels as a cushioning material. More specifically, I have discovered that elastic hydrogels formed, by way of example, of a borated guar gum or of a mixture of acrylamide and N,N'-methylene-bisacrylamide possesses remarkable shock absorbent characteristics for the packaging of materials by partial or complete immersion therein. Other hydrogels or gels may be used but these are given as specific examples or particular embodiments by which the invention may be effectuated.

Figure 2:
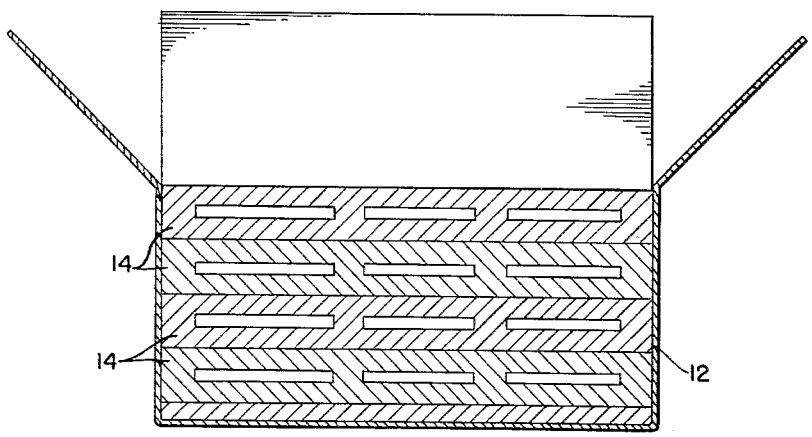

To illustrate the invention, specific embodiments are described hereinbelow with reference to the accompanying drawings wherein:

FIG. 1 is a sectional view of one form of package or packing arrangement of the invention, and FIG. 2 is a sectional view of another form of a package or packing arrangement of the invention.

Referring initially to FIG. 1, the product or item 11 to be packaged would be placed into a container 12 and a pre-prepared, non-viscous hydrogel forming liquid 13 would be poured into the container and around the product or products. Gelation would take place shortly thereafter. Thus, a supportive cushion and protective barrier would be rapidly, easily, and inexpensively placed partly or completely around a given product. For certain items, in order to prevent invasion of the product by the hydrogel, the product would be encased, for example, in a protective outer container such as a polyethylene bag from which air has been evacuated to cause the bag to engage the product as tightly as possible.

Following gelation, the final packaging steps would be carried out—closing, sealing, reinforcing if necessary, labeling, etc.—and the package would then be ready for shipping or safe storage. In using a gel as a packaging cushion and barrier material, packing procedures would be adapted to specific and specialized packaging demands. For example, as shown in FIG. 2, hydrogels containing an aggregate of products 14 could be layered for close multiple packing, packaging gels could be dyed and color-coded for systematized package identification or package disassembly, etc.

I have found that the use of hydrogels for packaging provides certain great advantages over methods presently employed. One immediate economic advantage resides in the fact that only a very small percentage by weight of the hydrogel forming agent is involved (thereby reducing shipping costs of the packaging material) and the hydrogel forming agents themselves are quite inexpensive by comparison with more conventional materials used for packaging. Furthermore, I have discovered that hydrogels exhibit special shock absorbing properties and have observed by light polarization tests) that the molecular structure of a hydrogel changes nearly instantaneously when subjected to shock at the point of impact, to provide an increased elastic or cushioning effect. To illustrate in empirical terms, it has been possible using the present method of packaging to encase a raw egg in its shell in a polyethylene container wherein about a pint of hydrogel surrounded the egg, thereafter permitting the egg and container to drop in free fall for 125 feet without visible damage to the egg. The principal reason attributed to this great ability on the part of hydrogels to absorb shock is that shock impact forces are not localized, but are distributed throughout the gel by hydrostatic action coupled with the aforementioned observed molecular reorientation at points of impact. Most hydrogels possess the somewhat unique characteristic of exhibiting viscosity changes under varying conditions of shear rate. This characteristic, which typifies the so-called Newtonian fluids, is quite likely a factor, though not necessarily the only factor, in the superior shock absorbing characteristics of hydrogels. The special elastic and shock absorbing qualities of the hydrogel are therefore impressive in comparison with known packaging materials and immediate use is seen for the new method of packaging particularly in transporting delicate instruments, wherein the percentage of breakage is such that the prices of certain items and the cost of insuring them are very nearly prohibitive.

As mentioned, in accordance with the invention, one of the hydrogel forming agents which can be readily obtainable and which is quite inexpensive is guar gum.

Guar gum is a component of the leguminous seed of the plant, *Cyamopsis tetragonolba*, which is widely grown in India, Pakistan, and the Middle East. A free-flowing whitish powder is produced when the raw product is milled. The guar molecule is essentially a straight-chain mannan with single membered galactose branches. The mannose units are linked in a 1-4 beta-glycosidic linkage and galactose branching takes place by means of a 1-6 linkage and occurs on alternate mannose units. Average molecular weight is 220,000. Guar gum tends to exhibit a wide range of gelling characteristics when subjected to different chemical treatment procedures. Borate ions, for example, act as cross-linking agents with galactomannans to produce, in alkaline solutions, tough, elastic, and rigid structural gels.

At present, two companies in the United States are carrying out the bulk of guar gum development and sales. These companies are Stein-Hall & Co., Inc., in New York and the Special Products Division of General Mills, Inc. in Minnesota. Industrial applications of guar gums currently are confined, primarily, to floatation, filtering, and thickening processes in the mining, paper, and foods industries. U.S. Patent No. 2,502,397 has been assigned to Stein-Hall and the patent concerns the use of guar in the flash pasteurization of ice cream mixes. The Atlas Powder Company has been assigned a patent relating to the use of guar in the waterproofing of stick explosives used under water.

The second hydrogel forming material used as a specific example herein and pertaining to the use of hydrogels for packaging is the mixture of two organic monomers (acrylamide and N,N'-methylenebisacrylamide) a synthetic organic compound initially developed by the American Cyanamid Co. now covered by U.S. Patent No. 2,475,846. This compound has been designated by American Cyanamid Co. as "AM-9" which short designation may be sometimes used in describing the compound hereinafter. The process by which gelation occurs is a polymerization-crosslinking reaction. The gel is formed in a two-step process.

*Step 1.*—An aqueous solution of AM-9, containing additives for controlling the gel time and one component of the catalyst system, is prepared.

*Step 2.*—The remaining component of the catalyst system (usually in water) is added to the solution of AM-9 prepared in step 1.

Two reactions occur in sequence:

Catalyst→Free Radicals

Free Radicals+AM-9→Polymer

The first reaction starts almost immediately after the second component of the catalyst system is added to the AM-9 solution. The rate of formation of free radicals and their rate of decomposition is strongly influenced by a number of factors. Control of these by proper selection of the catalyst system allows a predetermined amount of time to elapse before polymerization of AM-9 occurs. At the end of the reaction, a small amount of exothermic heat is evolved and long, flexible, polymer chains are formed. As these chains form, they simultaneously cross-link to form a stiff complex matrix which binds the solute water into a gel. The gel reaches maximum strength in a matter of minutes.

A specific example of the proportionate amounts and chemical compositions of the materials for forming a hydrogel for packaging in which AM-9 is the gel forming agent, will now be given:

*AM-9*

A relatively stiff, yet elastic hydrogel may be prepared for packaging various items, delicate instruments, etc. by utilizing in an aqueous solution the following components:

(a) An alkylidene bisacrylamide having the basic formula

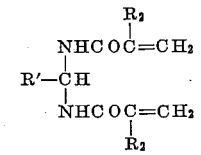

N,N'-methylene bisacrylamide in which

is an aldehyde residue and $R_2$ is of the group consisting of hydrogen and methyl.

(b) A water soluble ethylenic monomer having one or more $>C=C<$ groups. The unsubstituted bonds may be attached to many different atoms or radicals and the water soluble monomers having an acrylyl or methacrylyl group appear particularly well suited. Typical of these are N-methylol acrylamide, calcium acrylate, and acrylamide. All of these will copolymerize in an aqueous environment with the alkylidene bisacrylamide given in (a).

(c) A catalyst which could be of a number of types. Under normal use, however, a two component redox catalyst system comprised of beta-dimethylaminopropionitrile and ammonium persulfate would appear to be most advantageous.

The proportional weights of components (a) and (b) used in producing a hydrogel range from about (a) 0.005: (b) 1 to about (a) 0.2: (b) 1. The weight of redox catalyst system (c) required ranges from approximately 0.10% to 5% of the aggregate weight of the copolymerizable materials (a) and (b). The combined weight of all components (a), (b) and (c) required to gel a given quantity of water may vary from approximately 4½% to perhaps 50% of the weight of the water.

Example

An aqueous, low viscosity solution is prepared by mixing in a single container

| | Parts by weight |
|---|---|
| Water | 79 |
| N,N'-methylenebisacrylamide | 0.5 |
| Acrylamide | 9.5 |
| Beta-dimethylaminopropionitrile | 0.4 |

A second separate solution is prepared containing

| | Parts by weight |
|---|---|
| Water | 10 |
| Ammonium persulfate | 0.5 |

The ammonium persulfate solution is added to the first and at a solution temperature of 50° F. a tough gel will form in approximately five minutes. Gelation time may be altered substantially by means of introducing numerous inhibitors or accelerators into the solution. Gelation time may also be varied through changing the concentrations of catalyst, varying solution temperatures, and altering solution pH.

A specific example of the proportionate amounts and chemical compositions of the materials for forming a hydrogel for packinging in which guar is the gel forming agent, will now be given:

*Guar*

In alkaline aqueous solutions borate ions serve as cross-linking agents with the long-chain, guar galactomannans. The net effect of the borate cross-linkage is to produce an elastic and tough hydrogel. The relationship may be represented as follows:

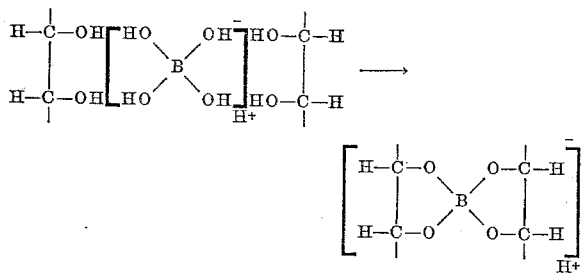

The relative weight of guar gum required as a percentage of the water to be gelled may vary from approximately 0.50% to 3%, any amount in excess of this being superfluous. Relative weight of borate ion (as in, for example, $Na_2B_4O_7 \cdot 10H_2O$) may vary from about 0.005% to 3% of the weight of the water to be gelled. It is important that the water be adjusted to alkaline pH's.

*Example*

A tough yet elastic hydrogel may be produced by mixing in a single container

| | Parts by weight |
|---|---|
| Water | 96 |
| Powdered guar gum | 2 |
| $Na_2B_4O_7 \cdot 10H_2O$ | 1 |
| NaOH | 1 |

A foamed hydrogel may be produced by incorporating into the mixture a foaming agent such as sodium lauryl sulfate.

*Example*

A foamed hydrogel is formed by placing in a single container and rapidly mixing so as to incorporate air

| | Parts by weight |
|---|---|
| Water | 95 |
| Powdered guar gum | 2 |
| $Na_2B_4O_7 \cdot 10H_2O$ | 1 |
| NaOH | 1 |
| Sodium lauryl sulfate | 1 |

Certain special circumstances may require treatment or variation of the basic hydrogel before it is used in packaging. These circumstances include factors of (1) the freezing of the gel, (2) the floating in the gel forming liquid, at time of packaging, of low density products, (3) the evaporation of the gel, (4) organism induced degradation of the gel packinging material occasioned by the bacterial, insect pest, etc. invasion of the gel, (5) the structural strength of the gel cushion in withstanding compressive, shear, and tension stress-strain under circumstances of high package shock or stress-strain induced as a consequence of the accommodation in packaging of extremely heavy or dense products, and (6) the disadvantageous aspects of the weight of the gel cushion-barrier itself. These points will be treated in the following:

(1) *The freezing of the gel.*—The freezing of a gel can in some cases bring about damage of the gel mass itself. In packaging, freezing and consequent expansion of hydrogels will, furthermore, damage the outer container and possibly the inner product. The solution, in part, to the freezing problem involves the use of "anti-freeze" electrolytes such as sodium chloride, calcium chloride, etc. in the gel solute in order to lower the freezing point of the gel. Expansion vacuoles or air spaces can also be incorporated in the pack.

(2) *The floating in the gel forming liquid of low density products.*—This problem is handled by means of fixing or "anchoring" a product in the outer container prior to the pouring into the container of the gel forming liquid. This can be accomplished in a number of ways; products may be weighted down or mechanically fixed to the outer container, products may be temporarily held beneath the gel forming liquid until gelation has occurred and the products are no longer able to float to the top of the gel, etc.

(3) *The evaporation of the gel.*—Most gels are subject to evaporation and therefore it would be necessary in packaging to insure that little or no vapor transfer from the inner gel to the outer atmosphere take place. A wide variety of foils, films, and coatings would serve in this connection as a vapor barrier and in many instances vapor loss would be controlled through usual package closure procedures involving the uses of vapor-proof lids, sealing tapes, over-wraps, etc.

(4) *Organism induced degradation of a gel cushion-barrier.*—Many gels, including those formed from guar (but not AM–9) are subject to bacterial and insect damage. Control of this damage can be easily accomplished by incorporating into the gel benzoic acid, phenol derivatives, phenyl mercuric acetate for bacterial control; wettable Dieldrin, DDT, etc. for insect control.

(5) *The structural strength of the gel package cushion.*—The ability of a gel cushion to withstand structural failure in supporting heavy products or in sustaining package shock is dependent upon such factors as the inherent physical characteristics of a particular gel formulation, concentrations of gel forming material in the gel matrix, the temperature of the gel, and several other factors. A raw gel may have, for example, the ability to resist structural failure at 5 to 8 pounds per square inch. Almost any inert, reasonably dense solid, such as silica sand, however, when mixed with a gel will result in a substantial increase in gel strength and will add considerably to the capability of a gel cushion in sustaining vibration, impact, compression, distortion, and puncturing damage or failure brought about in the packaging of heavy products, the stacking of packages, the rough handling and transport of packages.

(6) *The problem of weight in packaging with gels.*—In certain instances, the weight of a gel cushion-barrier could present shipping and handling problems to packagers and shippers. This problem, howover, may be overcome to a large degree by means of incorporating volumes of gas or low density fillers into the gel mix. (A specific example of a foamed guar hydrogel has previously been given.) Air or gas spaces may be incorporated into the gel packaging material through the use, prior to the formation of a rigid gel, of a variety of froth and foam forming agents which can in effect create a gel "sponge" constituted of as much as 90 or more percent gas or air. With some hydrogels—the guar derivatives, for example—air or gas entrapment in the gel mass may be accomplished by means of stirring air into the pre-gelated yet viscous gel forming liquid. Air entrapment may be done also by means of blowing air through the semi-plastic gel forming liquid to produce a short time later a "blown gel."

In incorporating low density fillers, such as sawdust, vermiculite, perlite, pulped paper, etc. into a gel forming liquid, the weight of the cushion-barrier could also be lessened very considerably. In mixing in a low density filler, it would be necessary to work with a fairly viscous gel forming liquid in order to inhibit the floating to the surface of the light filler material. The forming of a rigid, yet elastic, structural gel would occur at a later stage when the gel forming composition had been placed in the container and around the product or products. In employing fillers in gels, the gel forming material would have to possess the abilities of first forming with the solute a viscous, thick liquid phase and later a second rigid gel phase. This is very easily done with some of the guar derivatives.

In employing hydrogels including those specifically described herein, as a package cushioning material, far superior product support and flotation would, in many instances, be provided a product when compared with such cushioning materials as excelsior, paper, paper pulp, curled hair, spun glass, etc. The features of certain gels which make them superior packaging cushions are their uniformity, resiliency, their ability to absorb and uniformly distribute shock, their ability to provide closely embracing product support thus avoiding cushion "bridging," and finally a gel forming liquid of the appropriate type is capable of being emplaced around a product at points which would, with other cushioning materials, be difficult to reach and to support.

Gel cushioning prevents a packaged product from shifting or migrating within the outer container during periods of package movement and vibration. Product shifting, during times of handling and transport, often results in product damage and is a frequent packaging problem when granular, shaved, and other similar cushioning materials are used.

The speed and ease with which a gel cushion may be placed around a product offer significant advantages over many other materials now employed in product cushioning.

With the guar formed hydrogels, rigid hydrogels may be formed using 97 to 99 percent water and 1 to 3 percent guar derivative. AM-9 formed hydrogels may be formed using approximately 95 percent water and 5 percent AM-9. In using a hydrogel in packaging, such as the guar and "AM-9" constituted hydrogels, water would comprise the great bulk of the package cushion and very large savings could be afforded the industrial packager with respect to the transport, storage, and handling of raw cushion forming material, assuming that a water supply for making the gel mix was locally available. At present, the transport, storage, and handling of bulky cushioning materials, prior to their use in making up a package, is a serious problem to many manufacturers, particularly where available storage space is limited or costly and where too the transportation of materials is difficult and expensive.

The use of a hydrogel would provide, in packaging, not only a product cushion but also could provide for the contents of a package important packaging barrier features. The contents of a package incorporating a gel cushion-barrier would be protected to a considerable degree from such exteriorly produced hazards as fire, oil, water, acid vapors, corrosive gases, insect and arthropod pests, etc. In this connection, AM-9 hydrogels are extremely resistant to organism and chemically induced damage. The guar derivatives, however, appear to be more susceptible to breakdown and particularly those brought about through acid contact.

In employing a gel as a barrier forming material, it is obvious that a gel barrier could function as a protective material in containing and confining hazardous vapors, fluids, etc. which might originate from the packaged product itself.

In using translucent AM-9 hydrogels as a package cushion-barrier, it would be possible to visually examine products embedded in the undisturbed packaging material. This feature could be of considerable value with respect to the market appeal of a packaged product. The translucency of the packaging gel could also be of value in carrying out package examinations, inventories, and package disassembly.

In packaging with gels, a number of other aspects may be mentioned. Gel packaging offers, for example, non-abrasive cushioning qualities and is, when compared with excelsior, paper pulp, bagasse, etc., a dust-free packaging medium. Further, the use of gels may, with resourceful package engineering, be adapted to many package space-saving techniques. The essentially non-compressive characteristics of a solid hydrogel cushion could, in some circumstances, constitute an important attribute in packaging and particularly in the packaging of relatively fragile products which nonetheless are not subject to breakage under conditions of uniform compressive or hydrostatic stress. In this connection, products which fall into the non-compressible category and which might advantageously be packaged in solid hydrogels are such products as solid glassware, chine, ceramic products, metal items, etc.

It will be understood that the foregoing description is merely representative and relates to particular embodiments of the invention. In order therefore, to appreciate fully the spirit and scope of the invention, reference should be made to the appended claims in which I claim:

1. A package for protecting an article from physical damage comprising a container, an article in said container, and an organic elastic hydrogel surrounding and closely conforming to at least a portion of said article and in positive contact therewith, said hydrogel being capable of absorbing external shock in a manner characterized by non-Newtonian fluid.

2. A package according to claim 1 comprising antifreeze additives in the hydrogel to lower the freezing point thereof to prevent expansion of the hydrogel due to freezing.

3. A package according to claim 1 comprising a substantially vapor impermeable container so as substantially to prevent evaporation of the hydrogel.

4. A package according to claim 1 comprising a dense solid in said hydrogel to increase the hydrogel strength.

5. A package according to claim 1 comprising a hydrogel containing gas to substantially lessen the weight of the hydrogel.

6. A package for protecting an article from physical damage comprising a container, an article in said container, and an organic elastic hydrogel surrounding and closely conforming to at least a portion of said article in positive contact therewith, said hydrogel being a gelated product of a gel forming composition selected from a group consisting of (a) powdered guar gum in aqueous solution and (b) a mixture in aqueous solution, said mixture consisting of (i) an alkylidene bisacrylamide having the formula of

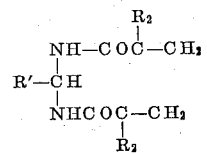

wherein

is an aldehyde residue and

is selected from the group consisting of hydrogen and methyl, (ii) a water solution ethylenic monomer having at least one =C—C= group, and (iii) a redox catalyst.

7. The package of claim 6 wherein said hydrogel is the gelated product of the composition (a) which contains 97 to 99 percent water and 1 to 3 percent guar gum, and the gelation of said hydrogel is promoted by borate ions.

8. The package of claim 6 wherein said hydrogel contains at least one additive to prevent bacterial and insect damage.

9. The package of claim 6 wherein said hydrogel is the gelated product of the composition (b), the proportional weight of (i) and (ii) in said hydrogel ranging from about (i) 0.005: (ii) 1 to about (i) 0.2: (ii) 1, the redox catalyst required is about 0.10% to 5% of the aggregate weight of (i) and (ii), and the combined weight of (i), (ii), and (iii) is about 4.5% to about 50% of the weight of the water.

References Cited by the Examiner

UNITED STATES PATENTS

| | | | |
|---|---|---|---|
| 1,740,176 | 12/1929 | Hormel et al. | 99—187 |
| 2,599,771 | 6/1952 | Moe | 260—209 |
| 2,780,350 | 2/1957 | Simon et al. | 206—46 |
| 2,895,603 | 7/1959 | Freeman | 206—46 |
| 2,971,640 | 2/1961 | Snelling | 206—46 |
| 3,080,355 | 3/1963 | Muller | 260—209 |

FOREIGN PATENTS 918,233   9/1954   Germany.

OTHER REFERENCES

Meypro A.G. application, 1,111,120, July 1961 (German), K1.8912.

43 Chemical Abstract, page 8717, November 1949.

THERON E. CONDON, *Primary Examiner.*

EARLE J. DRUMMOND, *Examiner.*

J. M. CASKIE, *Assistant Examiner.*